United States Patent
Mastrolia et al.

[11] 3,932,353
[45] Jan. 13, 1976

[54] STABILIZERS FOR FUNCTIONALLY TERMINATED BUTADIENE POLYMERS

[75] Inventors: Edmund J. Mastrolia, Sacramento; Harry J. Michigian, Carmichael, both of Calif.

[73] Assignee: Aerojet-General Corporation, El Monte, Calif.

[22] Filed: Sept. 28, 1970

[21] Appl. No.: 90,200

[52] U.S. Cl. ...... 260/45.75 G; 149/19.1; 149/19.2; 149/19.4; 149/19.9; 260/45.7 S; 260/45.75 C; 260/45.85 S; 260/45.9 QB; 260/94.2 R; 260/94.7 A
[51] Int. Cl. .................. C08f 45/60; C08f 45/62
[58] Field of Search ... 149/19; 260/77.5 SS, 78.4 D, 260/78.5 BB, 78.5 T, 94.7 S, 876 R, 53, 312, 45.7 S, 45.85 S, 94.2 R, 45.75 C, 45.9 QB, 94.7 A

[56] References Cited
UNITED STATES PATENTS

| | | | |
|---|---|---|---|
| 3,278,352 | 10/1966 | Erickson | 149/19 |
| 3,665,038 | 5/1972 | Bridger | 260/77.5 SS |

*Primary Examiner*—Leland A. Sebastian
*Attorney, Agent, or Firm*—Edward O. Ansell

[57] ABSTRACT

This patent describes a novel composition comprising the polymer of a butadiene polymer or other olefinic polymer containing functional groups and complementary reactive cross-linking agent such as polyisocyanate, aziridine or epoxide, and a stabilizer mixture therefor including (1) a secondary amine having the formula:

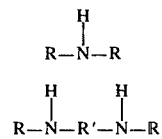

or wherein R is a monovalent aromatic group such as phenyl or naphthyl, and R' is a divalent aromatic group such as phenylene and (2) a thiodiester of the formula:

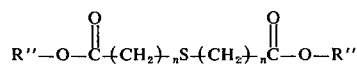

wherein R'' is a monovalent alkyl or aryl group such as methyl, ethyl, pentyl, decyl, phenyl, naphthyl and the like and $n$ is an integer from 1 to about 20.

9 Claims, No Drawings

STABILIZERS FOR FUNCTIONALLY TERMINATED BUTADIENE POLYMERS

BACKGROUND OF THE INVENTION

Various stabilizers are known for the conventional polyurethanes based on polyether polyols or hydroxy-terminated polyesters. These stabilizers, however, are not adequate for a newly developed class of polyurethane polymers obtained by the reaction of polyisocyanates with functionally terminated butadiene polymers, or for the class of polymers obtained by curing a carboxy-terminated butadiene polymer with an aziridine or epoxide. The unique stabilization problems associated with these polymers are believed to be due to the presence of both olefinic unsaturation and urethane or other hetero atom linkages in the polymer chain. The present invention is believed to represent a significant advance in the art by providing a combination of stabilizers for this class of polymers which is uniquely effective in stabilizing the polymer against degradation due to oxidation and decomposition of the urethane or other hetero linkages.

SUMMARY OF THE INVENTION

Briefly, the present invention comprehends a novel composition comprising a polymer containing carbon-to-carbon unsaturation and pendant functional groups and a complementary reactive cross-linking agent such as a polyisocyanate, aziridine or epoxide, and a stabilizer mixture therefor including (1) a secondary amine having the formula:

or

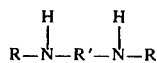

wherein R is a monovalent aromatic group such as phenyl or naphthyl, and R' is a divalent aromatic group such as phenylene and (2) a thiodiester of the formula:

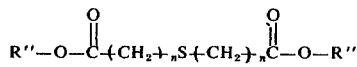

wherein R'' is a monovalent alkyl or aryl group such as methyl, ethyl, pentyl, decyl, phenyl, naphthyl and the like and n is an integer from 1 to about 20.

It is an object of this invention to provide a novel stabilizer system for polymers containing olefinic unsaturates as well as urethane or other hetero linkage.

Another object of this invention is to provide a novel stabilized polyurethane polymer system particularly adapted as a binder in solid rocket propellants.

A further object of this invention is the provision of a stabilizer system which prevents decomposition of the polyurethane by metallic polymerization catalyst residues.

These and other objects and advantages of this invention will be apparent from the following detailed description.

DESCRIPTION OF THE PREFERRED EMBODIMENTS

We have found that the surface and bulk stability of both filled and unfilled urethane polymers of functionally terminated butadiene polymer is uniquely enhanced by a combination of stabilizers.

The unique stabilizer combination includes a secondary amine of the type

or

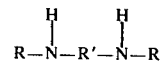

where R and R' are as defined above. Specific examples of these compounds are:

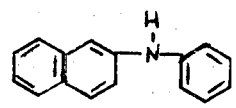, and

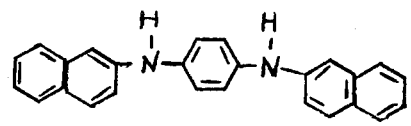

; and thiodipropionate esters of the type:

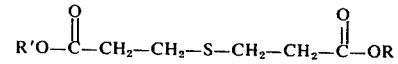

where R' is as defined above. The preferred ester is di-2-ethyhexyl-thiodipropionate.

The invention is applicable to all polymers containing carbon-to-carbon unsaturation in the backbone and functional groups which are either terminal or randomly distributed along the backbone. One preferred class of polymers is functionally terminated butadiene polymers cured with polyisocyanates, aziridine or epoxides. The functionally terminated butadienes include carboxy-terminated polybutadiene and co-polymers of acrylic acid and butadiene. In the case of carboxy-termination, curing or cross-linking is provided by aziridines such as tris(methyl aziridinyl) phosphine oxide, bis(methyl aziridiny)phenylphosphine oxide, N,N,N', N'-diethyleneurea, N,N,N', N'-diethylenethiourea, 1,4-bis-(-1-aziridinyl)butane, 1,10-bis-(-1-aziridinyl)-decane. N,N,N', N', N'', N'-triethylene trimesicamide, and tris(aziridinyl)phosphine sulfide, or di- or polyepoxides such as the diglycidyl ether of 2,2-(4-hydroxyphenyl) propane and the triglycidyl ether of glycerin.

The hydroxy-terminated butadiene polymers are cured with organic di or polyisocyanates such as ethylene diisocyanate, trimethylene diisocyanate, propylene-1,2-diisocyanate, tetramethylene diisocyanate, butylene-1,3-diisocyanate, decamethylene diisocyanate, octadecamethylene diisocyanate, 1-propylene-1,2-diisocyanate, 2-propylene-1, 2-diisocyanate, 1- butylene-1, 2-diisocyanate, 3-butylene-1, 2-diisocyanate, 1-butylene-1, 3-diisocyanate, 1-butylene-2, 3-diisocyanate, ethylidene diisocyanate, propylidene-1,1-diisocyanate, propylidene-2, 2-diisocyanate, cyclopentylene-1,3-diisocyanate, cyclohexylene-1, 3-diisocyanate, cyclohexylene-1,2-diisocyanate, cyclohexylene-1, 4-diisocyanate, cyclopentylidene diisocyanate, cyclohexylidene diisocyanate, m-phenylene diisocyanate, o-phenylene diisocyanate, p-phenylene diisocyanate, 1-methyl-2,4-phenylene diisocyanate, naphthylene-1,4-diisocyanate, diphenylene-4,4'-diisocyanate, 2,4-tolylene diisocyanate, 2,6-tolylene diisocyanate, 4,4'-diphenylmethane diisocyanate, 1,5-naphthalene diisocyanate, methylene-bis-(4-phenylisocyanate), 2,2-propylene-bis-(4-phenylisocyanate), xylylene-1,4-diisocyanate, xylylene-1, 3-diisocyanate, 4,4'-diphenylenemethane diisocyanate, 4,4'-diphenylenepropane diisocyanate, $OCN-CH_2CH_2-O-CH_2-CH_2-NCO$, and 2,3-pyridene diisocyanate.

In the case where the butadiene polymer is hydroxy-terminated, the cured polymer is a polyurethane, the formation of which is generally promoted by metallic urethane-forming catalysts such as ferric acetylacetonate. This catalyst system presents special problems which are solved by a preferred embodiment of this invention in which the two stabilizers discussed above are employed in combination with anhydrous metal salts such as chromium chloride and copper sulfate, and sulfur.

While not bound by any theory, it is believed that stabilization occurs as follows.

The amine acts as a free radical trap chromium chloride is used to free the iron or other heavy metal for further reaction as shown in equation IV. This latter reaction effectively eliminates iron or other heavy metal from the polymer medium and prevents it from catalyzing the degradation of the urethane link. In this manner, stability for prolonged periods of time at 180°F has been achieved.

The mechanism of stabilization involves the exchange of heavy metal ion and chromium ion to form the tightly bound chromium acetylacetonate, leaving heavy metal in the form of the chloride. The heavy metal species in this form readily reacts with the sulfide ion and is thus effectively removed as a reactive moiety in the polymer matrix. Once the heavy metal is in the form of the sulfide, it cannot catalyze oxidative attack or reverse the crosslinking reaction. In general, if the heavy metal is present as the acetylacetonate (to catalyze the polymerization reaction), $CrCl_3$ and sulfur are required; if the heavy metal is present as an impurity, then sulfur alone is sufficient. Typical examples of metallic compounds which are known catalysts for the polymerization reaction are $Fe(AA)_3$*, $MN(AA)_3$, $Mn(AA)_2$, $Cu(AA)_2$, Cu octoate, $Th(AA)_4$, $Zr(AA)_4$, $Ce(AA)_4$, $Ce(AA)_3$, $UO_2(AA)_2$, $V(AA)_3$, $VO(AA)_2$, $TiO(AA)_2$, $Zn(AA)_2$, Zn naphthenate, Zn decanoate, $Ni(AA)_2$, $Cr(AA)_3$, $Co(AA)_3$, $Co(AA)_2$, $In(AA)_3$, Ni-octoate, $Pb(AA)_2$, Pb naphthenate, Pb octoate, Sn-octoate, $Bu_2$ Sn laurate, $Bu_2$ Sn acetate. These same metallic ions can be present as impurities in the prepolymer curing effects or plasticizers.

* Acetylacetonate

The stabilizers of this invention are used in an effec-

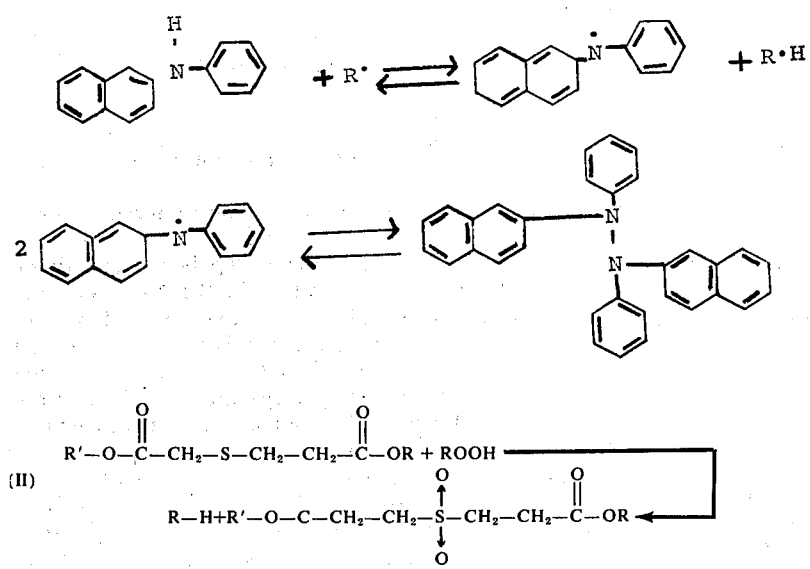

(II)
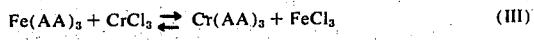

Chromium III chloride, copper sulfate or other metallic salts form tightly-bound compounds with acetylacetone.

$$Fe(AA)_3 + CrCl_3 \rightleftarrows Cr(AA)_3 + FeCl_3 \quad (III)$$

Sulfur which is reduced to the sulfide which then forms iron sulfide $$3S^{2-} + Fe^3 \rightleftarrows Fe_2S_3 \quad (IV)$$

The stabilization reactions shown in III and IV above are required in the event that a heavy metal acetylacetonate such as ferric acetylacetonate is used as a polymerization cataylst, or where heavy metal ions are present due to impurities in the propellant. In this case, tive stabilizing amount, generally on the order of about 0.15 to 0.25% by weight amine, about 0.05 to 0.10% by weight ester, 0.07 to 0.12% by weight chromium III salt; and 0.15 to 0.45% by weight sulfur, all based on the total weight of the composition.

The improvement in the stability of polyurethanes from hydroxy-terminated polybutadiene and toluene diisocyanate and solid rocket propellants are shown in Tables 1, 2 and 3. The aging of HTPB binders at 180°F with and without these stabilizers is shown in Table 1. In the absence of stabilizer, the binder rapidly surface hardens at +180°F. The amine antioxidant sym-di-βnaphthyl-p-phenylene diamine markedly improves the binder surface aging properties. The effectiveness of the di-δ-ethylhexyl thiodipropionate is also seen in Table 1.

TABLE I

EFFECT OF STABILIZER TYPE ON THE HIGH TEMPERATURE STORAGE STABILITY OF A POLYURETHANE FROM HYDROX-TERMINATED POLYBUTADIENE AND TOLUENE DIISOCYANATE

Rex Hardness of Binder Surface Stabilizer Combination

| Storage Time at 180°F | None | sym-di-β-naphthyl-p p-phenylene-diamine | di-α-ethylhexyl thiodipropionate | amine/ester |
|---|---|---|---|---|
| None | 50 | 50 | 50 | 50 |
| 4 days | 90 | 50 | 50 | 50 |
| 1 week | >90 | 50 | 60 | 50 |
| 4 months | >90 | 60 | >90 | 50 |

In the above Table, the amine was used in an amount equal to 0.20% by weight and the ester was used in an amount equal to 0.05% by weight, both based on the total weight of the composition.

The best results are obtained with a combination of the amine and ester. There has been no change in the binder surface hardness even after four months storage at 180°F.

The effect of the compounds selected to improve the bulk aging properties of the hydroxy-terminated polybutadiene propellant is shown in Tables 2 and 3. This system contains ferric acetylacetoneate.

TABLE 2

EFFECT OF STABILIZERS ON THE 180°F STORAGE STABILITY OF 88% SOLIDS PROPELLANTS

| Batch No. | 1 | | | | | 2 | | | | | 3 | | | | | 4 | | | | |
|---|---|---|---|---|---|---|---|---|---|---|---|---|---|---|---|---|---|---|---|---|
| Stabilizers | | | | | | | | | | | | | | | | | | | | |
| Sulfur | — | | | | | 0.50 | | | | | — | | | | | 0.50 | | | | |
| CuSO₄ | — | | | | | — | | | | | 0.10 | | | | | 0.10 | | | | |
| sym-di-β-naphthyl-p-phenylene-diamine | — | | | | | — | | | | | — | | | | | 0.20 | | | | |
| di-α-ethylhexyl thiodipropionate | — | | | | | — | | | | | — | | | | | 0.05 | | | | |

Mechanical Properties at +77°F**

| Storage Time at 180°F, weeks | S/I* | σₘ psi | εₘ % | εᵦ % | E₀ psi | S/I* | σₘ psi | εₘ % | εᵦ % | E₀ psi | S/I* | σₘ psi | εₘ % | εᵦ % | E₀ psi | S/I* | σₘ psi | εₘ % | εᵦ % | E₀ psi |
|---|---|---|---|---|---|---|---|---|---|---|---|---|---|---|---|---|---|---|---|---|
| 0 | — | 93 | 67 | 73 | 372 | — | 100 | 61 | 69 | 426 | 50/48 | 103 | 64 | 71 | 400 | 60/45 | 100 | 51 | 53 | 428 |
| 1 | 53/16 | 35 | 42 | 93 | 184 | 54/27 | 48 | 36 | 85 | 295 | 58/38 | 67 | 80 | 88 | 244 | 66/45 | 91 | 52 | 55 | 470 |
| 2 | 76/0 | Too soft for testing | | | | 77/9 | 28 | 50 | 79 | 243 | — | 49 | 87 | 99 | 158 | 78/40 | 99 | 43 | 51 | 487 |
| 3 | | | | | | | Too soft for testing | | | | | Too soft for testing | | | | 88/59 | 132 | 42 | 42 | 627 |
| 4 | | | | | | | | | | | | | | | | 89/68 | 157 | 32 | 33 | 878 |
| 5 | | | | | | | | | | | | | | | | 90/72 | 163 | 27 | 28 | 1057 |
| 6 | | | | | | | | | | | | | | | | 89/73 | 152 | 21 | 21 | 1229 |
| 7 | | | | | | | | | | | | | | | | | | | | |
| 8 | | | | | | | | | | | | | | | | | | | | |

S=Shore "A" hardness on propellant surface.
I=Shore "A" hardness on propellant interior
**Standard ICRPG tensile specimens tested in suplicate and at a strain rate of 0.74 in./in./min.

TABLE 3

IMPROVED SURFACE AND BULK AGING PROPERTIES OF 88% SOLIDS PROPELLANTS

| Batch No. | 4 | | | | | 5 | | | | |
|---|---|---|---|---|---|---|---|---|---|---|
| Stabilizer | | | | | | | | | | |
| CuSO₄ | 0.10 | | | | | — | | | | |
| CrCl₃ | — | | | | | 0.10 | | | | |
| Sulfur | 0.50 | | | | | 0.50 | | | | |
| sym-di--naphthyl-p-phenylene-diamine | 0.20 | | | | | 0.20 | | | | |
| di--ethylhexyl thiodipropionate | 0.05 | | | | | 0.05 | | | | |

Mechanical Properties at 77°F*

| Storage Time at 180°F. Wks | S/I** | m psi | m % | b % | E₀ psi | S/I** | m psi | m % | b % | E₀ psi |
|---|---|---|---|---|---|---|---|---|---|---|
| 0 | 60/45 | 100 | 51 | 53 | 428 | 41/47 | 87 | 59 | 64 | 302 |
| 1 | 66/45 | 91 | 52 | 55 | 470 | — | — | — | — | — |
| 2 | 78/40 | 99 | 43 | 51 | 287 | 44/45 | 92 | 55 | 68 | 311 |
| 3 | 85/59 | 132 | 42 | 42 | 627 | — | — | — | — | — |
| 4 | 89/68 | 157 | 32 | 33 | 878 | — | — | — | — | — |
| 5 | 90/72 | 163 | 27 | 28 | 1057 | 54/47 | 83 | 61 | 63 | 291 |
| 6 | 89/73 | 152 | 21 | 21 | 1229 | — | — | — | — | — |
| 8 | — | — | — | — | — | 59/47 | 89 | 58 | 61 | 317 |

*Standard ICRPG tensile specimen tested in duplicate and at a strain rate of 0.74 in./in./min.
**S=Shore "A" hardness on propellant surface
I=Shore "A" hardness on propellant interior The effect on 180°F aging of no stabilizer, CuSO$_4$, alone, sulfur alone and a combination of CuSO$_4$ and sulfur are shown in Table 2. It is seen that only a combination of sulfur and CuSO$_4$ is effective in preventing bulk softening of this propellant.

The most effective stabilizer system is shown in Table 3. Here a combination of CrCl$_3$, sulfur, sym-di-β-naphthyl-p-phenylene diamine and di-δ-ethylhexyl thiodipropionate were found to yield at least 8 weeks of storage at 180°F with very little change in either bulk or surface properties.

Propellants 1–5 described above have the following compositions:

(C)

| Batch No. | 1 | 2 | 3 | 4 | 5 |
|---|---|---|---|---|---|
| Ingredient, wt% | | | | | |
| NH$_4$ClO$_4$ | 73.00 | 73.00 | 73.00 | 73.00 | 73.00 |
| Aluminum Powder | 15.00 | 15.00 | 15.00 | 15.00 | 15.00 |
| Hydroxy-terminated polybutadiene | 7.194 | 6.894 | 7.141 | 6.464 | 6.464 |
| Propylene oxide adduct of 1, 2, 6 hexane triol | .233 | .223 | .231 | 0.323 | 0.323 |
| biscyanoethyl dihydroxypropyl aniline | .039 | .037 | .038 | 0.045 | 0.045 |
| Toluene diisocyanate | .321 | .308 | .312 | 0.402 | 0.402 |
| Dioctyl Sebacate | 4.193 | 4.018 | 4.658 | 3.896 | 3.896 |
| Copper II Sulfate | — | — | 0.100 | 0.100 | — |
| Chromium III chloride | — | — | — | — | 0.10 |
| Sulfur | — | 0.50 | — | 0.50 | 0.50 |
| Phenyl-beta naphthyl amine | — | — | — | — | 0.20 |
| Sym. di-βnaphthyl-p-phenylenediamine | — | — | — | 0.20 | 0.20 |
| di-2 ethylhexyl-thiodipropionate | — | — | — | 0.05 | 0.05 |
| Ferric acetyl acetonate | 0.02 | .02 | 0.02 | 0.02 | 0.02 |

In general, the propellants of this invention contain conventional additives such as solid oxidizing agents such as ammonium perchlorate and metal fuels such as powdered aluminum boron and beryllium.

Having fully described the invention, it is intended that it be limited only by the lawful scope of the appended claims.

We claim:

1. A novel composition comprising a polybutadiene polymer, said polymer bearing either pendant or terminal functional groups, a cross-linking agent reactive with said polybutadiene polymer, said cross-linking agent being selected from the group consisting of a polyisocyanate, an aziridine and an epoxide, and a stabilizer mixture including
   1. a secondary amine having the formula

or

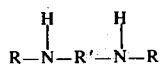

wherein R is a monovalent aromatic group and R' is a divalent aromatic group; and 2. a thiodiester of the formula

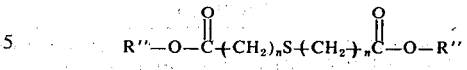

wherein R'' is a monovalent organic group and n is an integer from 1 to about 20.

2. The composition of claim 1 wherein the amine is sym-di-β-naphthyl-p-phenylene diamine and the ester is di-δ-ethylhexyl thiodipropionate.

3. The composition of claim 1 wherein the amine is present in an amount from about 0.15 to 0.25% by weight and the ester is present in an amount from about 0.05 to 0.10% by weight, based on the total weight of the composition.

4. The composition of claim 1 wherein the polybutadiene polymer bears carboxy functional groups and wherein the cross-linking agent therefor is selected from the group consisting of an aziridine and an epoxide.

5. A novel composition comprising a polybutadiene polymer, said polymer bearing hydroxy functional groups and containing heavy metal ions, a polyisocyanate cross-linking agent for such polybutadiene polymer, and a stabilizer mixture including
   1. a secondary amine having the formula

or

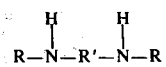

wherein R is a monovalent aromatic group and R' is a divalent aromatic groups;
   2. a thiodiester of the formula

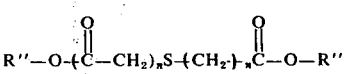

wherein R'' is a monovalent organic group and n is an integer from 1 to about 20; and
3. sulfur.

6. A novel composition comprising a polybutadiene polymer, said polymer bearing hydroxy functional groups and containing heavy metal ions and catalyst residues of heavy metal acetylacetonate, a polyisocyanate cross-linking agent for such polybutadiene polymer, and a stabilizer mixture including
1. a secondary amine having the formula

or

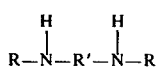

wherein R is a monovalent aromatic group and R' is a divalent aromatic groups;
2. a thiodiester of the formula

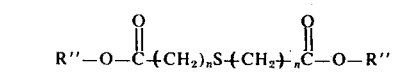

wherein R'' is a monovalent organic group and n is an integer from 1 to about 20;
3. an anhydrous metal salt capable of reacting with said acetylacetonate; and
4. sulfur.

7. The composition of claim 6 wherein the amine is sym-di-β-naphthyl-p-phenylene diamine, the ester is di-δ-ethylhexyl thiodipropionate and the metal salt is chromium chloride.

8. The composition of claim 6 wherein the metal salt is chromicchloride.

9. The composition of claim 8 wherein the amine is present in an amount from about 0.15 to 0.25% by weight, the ester is present in an amount from about 0.05 to 0.10% by weight, the chromium compound is present in an amount from about 0.07 to 0.12% by weight and sulfur is present in an amount from about 0.15 to 0.45% by weight based on the total weight of the composition.

* * * * *